US008205675B2

(12) United States Patent
Brannon et al.

(10) Patent No.: US 8,205,675 B2
(45) Date of Patent: Jun. 26, 2012

(54) METHOD OF ENHANCING FRACTURE CONDUCTIVITY

(75) Inventors: Harold Dean Brannon, Magnolia, TX (US); Brian N. Ward, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 352 days.

(21) Appl. No.: 12/248,773

(22) Filed: Oct. 9, 2008

(65) Prior Publication Data

US 2010/0089580 A1 Apr. 15, 2010

(51) Int. Cl.
 *E21B 43/267* (2006.01)
(52) U.S. Cl. .................. 166/308.3; 166/280.1; 166/281; 166/283; 166/308.5
(58) Field of Classification Search .................. None
 See application file for complete search history.

(56) References Cited

U.S. PATENT DOCUMENTS

| | | | |
|---|---|---|---|
| 2,596,843 A | 5/1952 | Farris | |
| 2,966,457 A | 12/1960 | Starmann et al. | |
| 3,089,542 A | 5/1963 | Kolodny | |
| 3,149,673 A | 9/1964 | Pennington | |
| 3,149,674 A | 9/1964 | Schutze et al. | |
| 3,175,615 A | 3/1965 | East | |
| 3,254,717 A | 6/1966 | Huitt et al. | |
| 3,266,573 A | 8/1966 | Rixe | |
| 3,335,796 A | 8/1967 | Parker, Jr. | |
| 3,492,147 A | 1/1970 | Young | |
| 3,659,651 A | 5/1972 | Graham | |
| 3,888,311 A | 6/1975 | Cooke | |
| 3,929,191 A | 12/1975 | Graham et al. | |
| 3,937,283 A | 2/1976 | Blauer et al. | |
| 4,051,900 A | 10/1977 | Hankins | |
| 4,074,760 A | 2/1978 | Copeland et al. | |
| 4,078,610 A | 3/1978 | Arnold | |
| 4,195,010 A | 3/1980 | Russell et al. | |
| 4,216,829 A | 8/1980 | Murphey | |
| 4,421,167 A | 12/1983 | Erbstoesser et al. | |
| 4,439,489 A | 3/1984 | Johnson et al. | |
| 4,462,466 A | 7/1984 | Kachnik | |
| 4,493,875 A | 1/1985 | Beck | |
| 4,502,967 A | 3/1985 | Conway | |
| 4,506,734 A | 3/1985 | Nolte | |
| 4,547,468 A | 10/1985 | Jones et al. | |
| 4,585,064 A | 4/1986 | Graham et al. | |
| 4,632,876 A | 12/1986 | Laird et al. | |
| 4,654,266 A | 3/1987 | Kachnik | |
| 4,680,230 A | 7/1987 | Gibb et al. | |
| 4,717,594 A | 1/1988 | Graham et al. | |
| 4,733,729 A | 3/1988 | Copeland | |
| 4,796,701 A | 1/1989 | Hudson et al. | |
| 4,829,100 A | 5/1989 | Murphey et al. | |
| 4,830,794 A | 5/1989 | Edgley et al. | |
| 4,840,729 A | 6/1989 | Levine | |
| 4,869,960 A | 9/1989 | Gibb et al. | |
| 4,875,525 A | 10/1989 | Manna | |
| 4,887,670 A | 12/1989 | Lord et al. | |
| 4,888,240 A | 12/1989 | Graham et al. | |
| 4,921,820 A | 5/1990 | Rumpf et al. | |
| 4,923,714 A | 5/1990 | Gibb et al. | |
| 5,069,283 A | 12/1991 | Mack | |
| 5,103,905 A | 4/1992 | Brannon et al. | |
| 5,175,133 A | 12/1992 | Smith et al. | |
| 5,201,370 A | 4/1993 | Tjon-Joe-Pin | |
| 5,240,654 A | 8/1993 | Smith et al. | |
| 5,305,832 A | 4/1994 | Gupta et al. | |
| 5,330,005 A | 7/1994 | Card et al. | |
| 5,422,183 A | 6/1995 | Sinclair et al. | |
| 5,425,421 A | 6/1995 | Coleman et al. | |
| 5,435,391 A | 7/1995 | Jones | |
| 5,439,055 A | 8/1995 | Card et al. | |
| 5,443,633 A | 8/1995 | Hirsbrunner et al. | |
| 5,492,178 A | 2/1996 | Nguyen | |
| 5,501,275 A | 3/1996 | Card et al. | |
| 5,515,920 A | 5/1996 | Luk | |
| 5,547,506 A | 8/1996 | Rae et al. | |
| 5,551,344 A | 9/1996 | Couet et al. | |
| 5,562,160 A | 10/1996 | Brannon et al. | |
| 5,582,249 A | 12/1996 | Caveny et al. | |
| 5,597,784 A | 1/1997 | Sinclair et al. | |

(Continued)

FOREIGN PATENT DOCUMENTS

CA 2329834 A1 6/2002

(Continued)

OTHER PUBLICATIONS

Wood, et al; Ultra-Lightweight Proppant Development Yields Exciting New Opportunities in Hydraulic Fracturing Design; SPE 84309; Society of Petroleum Engineers, Inc.; 2003.

(Continued)

*Primary Examiner* — Zakiya W Bates
(74) *Attorney, Agent, or Firm* — John Wilson Jones; Jones & Smith, LLP

(57) ABSTRACT

The method disclosed herein includes the introduction of proppant-free stage and a proppant laden stage into the wellbore and/or subterranean formation. The method increases the effective fracture width and enhances fracture conductivity within the formation. Either the proppant-free stage or the proppant laden stage contains a breaker. The other stage contains a viscosifying polymer or viscoelastic surfactant to which the breaker has affinity. The proppant-free stage may be introduced prior to introduction of the proppant laden stage into the wellbore and/or formation. Alternatively, the proppant laden stage may be introduced into the wellbore and/or formation prior to introduction of the proppant-free stage.

61 Claims, No Drawings

U.S. PATENT DOCUMENTS

| | | |
|---|---|---|
| 5,604,184 A | 2/1997 | Ellis et al. |
| 5,699,860 A | 12/1997 | Grundmann |
| 5,799,734 A | 9/1998 | Norman et al. |
| 5,837,656 A | 11/1998 | Sinclair |
| 5,908,073 A | 6/1999 | Nguyen et al. |
| 5,916,933 A | 6/1999 | Johnson et al. |
| 5,921,317 A | 7/1999 | Dewprashad et al. |
| 5,924,488 A | 7/1999 | Nguyen et al. |
| 5,948,734 A | 9/1999 | Sinclair |
| 5,950,727 A | 9/1999 | Irani |
| 5,955,144 A | 9/1999 | Sinclair et al. |
| 5,960,878 A | 10/1999 | Nguyen et al. |
| 5,964,289 A | 10/1999 | Hill |
| 5,964,291 A | 10/1999 | Bourne et al. |
| 6,047,772 A | 4/2000 | Weaver et al. |
| 6,070,666 A | 6/2000 | Montgomery |
| 6,079,492 A | 6/2000 | Hoogteerjling et al. |
| 6,114,410 A | 9/2000 | Betzold |
| 6,116,342 A | 9/2000 | Clark et al. |
| 6,138,760 A | 10/2000 | Lopez et al. |
| 6,172,011 B1 | 1/2001 | Card et al. |
| 6,194,355 B1 | 2/2001 | Jarrett et al. |
| 6,209,643 B1 | 4/2001 | Nguyen et al. |
| 6,211,120 B1 | 4/2001 | Welch et al. |
| 6,230,805 B1 | 5/2001 | Verdaemer et al. |
| 6,248,838 B1 | 6/2001 | Albright |
| 6,311,773 B1 | 11/2001 | Todd et al. |
| 6,315,041 B1 | 11/2001 | Carlisle |
| 6,328,105 B1 | 12/2001 | Betzold |
| 6,348,629 B1 | 2/2002 | Albright |
| 6,372,678 B1 | 4/2002 | Youngman et al. |
| 6,406,789 B1 | 6/2002 | McDaniel et al. |
| 6,410,489 B1 | 6/2002 | Zhang et al. |
| 6,439,309 B1 | 8/2002 | Matherly et al. |
| 6,439,310 B1 | 8/2002 | Scott, III et al. |
| 6,451,953 B1 | 9/2002 | Albright |
| 6,503,676 B2 | 1/2003 | Yamashita et al. |
| 6,528,157 B1 | 3/2003 | Mc Daniel et al. |
| 6,541,579 B2 | 4/2003 | Albright |
| 6,579,947 B2 | 6/2003 | Heitz et al. |
| 6,632,527 B1 | 10/2003 | McDaniel |
| 6,640,897 B1 | 11/2003 | Misselbrook et al. |
| 6,667,261 B1 | 12/2003 | Anshits et al. |
| 6,705,400 B1 | 3/2004 | Nguyen et al. |
| 6,725,931 B2 | 4/2004 | Nguyen et al. |
| 6,742,590 B1 | 6/2004 | Nguyen |
| 6,749,025 B1 | 6/2004 | Brannon et al. |
| 6,766,817 B2 | 7/2004 | da Silva |
| 6,830,105 B2 | 12/2004 | Thesing et al. |
| 6,875,728 B2 | 4/2005 | Gupta et al. |
| 7,001,872 B2 | 2/2006 | Pyecroft et al. |
| 7,036,590 B2 | 5/2006 | Harris |
| 7,036,591 B2 | 5/2006 | Cannan et al. |
| 7,036,597 B2 | 5/2006 | O'Brien et al. |
| 7,066,258 B2 | 6/2006 | Justus et al. |
| 7,086,460 B2 | 8/2006 | Nguyen et al. |
| 7,115,546 B2 | 10/2006 | Qu et al. |
| 7,144,844 B2 | 12/2006 | Qu et al. |
| 7,205,264 B2 | 4/2007 | Boles |
| 7,207,386 B2 | 4/2007 | Brannon et al. |
| 7,210,528 B1 | 5/2007 | Brannon et al. |
| 7,226,971 B2 | 6/2007 | Ramesh et al. |
| 7,270,879 B2 | 9/2007 | McCrary |
| 7,322,411 B2 | 1/2008 | Brannon et al. |
| 7,361,693 B2 | 4/2008 | Albright et al. |
| 7,426,961 B2 | 9/2008 | Stephenson et al. |
| 2003/0224165 A1 | 12/2003 | Anderson et al. |
| 2004/0023812 A1 | 2/2004 | England et al. |
| 2004/0023818 A1 | 2/2004 | Nguyen et al. |
| 2004/0040708 A1 | 3/2004 | Stephenson et al. |
| 2004/0138071 A1 | 7/2004 | Gupta et al. |
| 2004/0206497 A1 | 10/2004 | Gonzalez et al. |
| 2004/0244978 A1 | 12/2004 | Shaarpour |
| 2005/0016732 A1 | 1/2005 | Brannon et al. |
| 2005/0028976 A1 | 2/2005 | Nguyen et al. |
| 2005/0113264 A1 | 5/2005 | Vollmer |
| 2005/0244641 A1 | 11/2005 | Vincent |
| 2005/0272612 A1 | 12/2005 | Dawson et al. |
| 2006/0065398 A1 | 3/2006 | Brannon et al. |
| 2006/0073980 A1 | 4/2006 | Brannon et al. |
| 2006/0258546 A1 | 11/2006 | Brannon et al. |
| 2007/0087941 A1 | 4/2007 | Cawiezel |
| 2007/0173417 A1 | 7/2007 | Kaufman et al. |
| 2007/0209794 A1 | 9/2007 | Kaufman et al. |
| 2007/0209795 A1 | 9/2007 | Gupta et al. |
| 2007/0270316 A1 | 11/2007 | Shaari et al. |
| 2008/0087429 A1 | 4/2008 | Brannon et al. |
| 2008/0176773 A1 | 7/2008 | Wheeler et al. |
| 2008/0179057 A1 | 7/2008 | Dawson |
| 2008/0182761 A1 | 7/2008 | Stephenson et al. |
| 2008/0190603 A1 | 8/2008 | Brannon |
| 2008/0190619 A1 | 8/2008 | Brannon et al. |
| 2008/0269082 A1* | 10/2008 | Wilson et al. ............ 507/212 |
| 2009/0044945 A1* | 2/2009 | Willberg et al. .......... 166/308.1 |
| 2009/0075845 A1* | 3/2009 | Abad et al. ............... 507/117 |

FOREIGN PATENT DOCUMENTS

| | | |
|---|---|---|
| EP | 0308257 A2 | 3/1989 |
| EP | 1 023 382 B1 | 8/2006 |
| GB | 2319796 B | 3/1998 |
| WO | 02/26656 A1 | 4/2002 |

OTHER PUBLICATIONS

Gupta et al; The History and Success of Liquid CO2 and CO2/N2 Fracturing System; SPE 40016; Society of Petroleum Engineers, Inc.; 1998.

Wolhart, Stephen; Advanced Hydraulic Fracture Diagnostics Optimize Development in the Bossier Sands; WorldOil Magazine, vol. 226 No. 7; Jul. 2005.

Liu et al; Proppant Placement Using Reverse-Hybrid Fracs; SPE 99580-PA; Society of Petroleum Engineers, Inc.; 2007.

U.S. Appl. No. 11/971,811, filed Jan. 9, 2008, Brannon et al.
U.S. Appl. No. 12/013,775, filed Jan. 14, 2008, Kaufman et al.
U.S. Appl. No. 11/952,847, filed Dec. 7, 2007, Dajani et al.
U.S. Appl. No. 12/129,478, filed May 29, 2008, Le et al.
U.S. Appl. No. 12/180,219, filed Jul. 25, 2008, Wheeler et al.

* cited by examiner

METHOD OF ENHANCING FRACTURE CONDUCTIVITY

FIELD OF THE INVENTION

The invention relates to a method of stimulating a subterranean formation in at least two stages. One stage contains a proppant-free fluid and another stage contains a proppant laden slurry. At least one of the stages contains a breaker which has affinity for a viscosifying polymer or viscoelastic surfactant present in the other stage.

BACKGROUND OF THE INVENTION

Hydraulic fracturing is a common stimulation technique used to enhance production of fluids from subterranean formations. Hydraulic fracturing is typically used to stimulate low permeability formations where recovery efficiency is limited.

During hydraulic fracturing, a fracturing fluid is pumped at high pressures and high rates into a wellbore penetrating a subterranean formation to initiate and propagate a fracture in the formation. Well productivity depends on the ability of the fracture to conduct fluids from the formation to the wellbore. The treatment design generally requires the fluid to reach maximum viscosity as it enters the fracture which affects the fracture length and width. The requisite viscosity is typically obtained by the gellation of viscosifying polymers and/or surfactants in the fracturing fluid. The gelled fluid is typically accompanied by a proppant which results in placement of the proppant within the produced fracture.

Once the fracture is initiated, subsequent stages of fracturing fluid containing proppant are pumped into the created fracture. The fracture generally continues to grow during pumping and the proppant remains in the fracture in the form of a permeable "pack" that serves to "prop" the fracture open. Once the treatment is completed, the fracture closes onto the proppants which maintain the fracture open, providing a highly conductive pathway for hydrocarbons and/or other formation fluids to flow into the wellbore.

Filtrate from the fracturing fluid ultimately "leaks off" into the surrounding formation leaving a filter cake comprised of fluid additives. Such additives, including the viscosifying polymers and/or surfactants used to provide fluid viscosity, are typically too large to penetrate the permeable matrix of the formation. Recovery of the fracturing fluid is therefore an important aspect to the success of the fracturing treatment.

Recovery of the fracturing fluid is normally accomplished by reducing the viscosity of the fracturing fluid (breaking) such that the fracturing fluid flows naturally from the formation under the influence of formation fluids and pressure. Conventional oxidative breakers react rapidly at elevated temperatures, potentially leading to catastrophic loss of proppant transport. Encapsulated oxidative breakers have experienced limited utility at elevated temperatures due to a tendency to release prematurely or to have been rendered ineffective through payload self-degradation prior to release. Thus, the use of breakers in fracturing fluids at elevated temperatures, i.e., above about 120-130° F., typically compromises proppant transport and desired fracture conductivity, the latter being measured in terms of effective propped fracture length. Improvements in hydraulic fracturing techniques are required in order to increase the effective propped fracture length and thereby improve stimulation efficiency and well productivity.

Recently, fluids (such as water, salt brine and slickwater) which do not contain a viscosifying polymer have been used in the stimulation of tight gas reservoirs as hydraulic fracturing fluids. Such fluids are much cheaper than conventional fracturing fluids containing a viscosifying polymer and/or gelled or gellable surfactant. In addition, such fluids introduce less damage into the formation in light of the absence of a viscosifying polymer and/or surfactant in the fluid.

The inherent properties of fluids not containing a viscosifying polymer, such as slickwater, present however several difficulties. Foremost, such fluids provide poor proppant transport as well as poor fluid efficiency (leakoff control). Further, the low viscosity of fluids like water, salt brine and slickwater makes it difficult, if not impossible, to generate the desired fracture width. This affects the requisite conductivity of the propped fracture as proppant placement in the fracture is often not possible.

To address such limitations, "hybrid" fracturing techniques have evolved wherein a conventional gelled and/or crosslinked fracturing fluid is used as a pad fluid which precedes the introduction of a proppant laden slickwater slurry. The relatively high viscosity gelled fluid provides increased fracture width and improved fluid efficiency, thereby mitigating the limitations of slickwater. Unfortunately, however, viscosifying polymers and surfactants used in such viscosified fluids form filter cakes on fracture faces which cause conductivity damage. Since the concentration of proppant in fracturing fluids free of viscosifying polymer and viscoelastic surfactant is low and results in propped fracture widths typically no greater than one layer of proppant (±0.5 mm), any effective fracture width lost to the deposition of a filter cake often has catastrophic consequences on fracture conductivity.

Alternative hydraulic fracturing methods have therefore been sought which increase the effective propped fracture length of created fractures and which enhance fracture conductivity. Alternative methods have been particularly sought for fracturing using fluids which are free of viscosifying polymers.

SUMMARY OF THE INVENTION

Effective propped fracture length is increased and fracture conductivity enhanced by pumping into a subterranean formation penetrated by a wellbore and/or the wellbore at least two separate stages. At least one of the stages is void of proppant (proppant-free) and the other stage contains proppant. One of the stages contains a viscosifying polymer or viscoelastic surfactant. The other stage contains a breaker. The breaker has the greatest affinity for the viscosifying polymer or viscoelastic surfactant which is present in the stage which does not contain the breaker. Either stage may also contain a friction reducer. When present in the same stage as the breaker, the breaker exhibits little, if any, affinity towards the friction reducer.

The breaker is preferably used at a concentration sufficient to cause at least partial degradation of filter cake and to facilitate the removal of the filter cake from the fracture.

The methodology has particular applicability when one of the stages is void of a any viscosifying polymer or viscoelastic surfactant and is composed of water, salt brine or slickwater.

The viscosifying polymer is preferably a hydratable polymer including galactomannan gums, guars, derivatized guars, cellulose and cellulose derivatives, starch, starch derivatives, xanthan, derivatized xanthan and mixtures thereof.

The methodology may be employed to create a partial monolayer fracture in the formation.

DETAILED DESCRIPTION OF THE PREFERRED EMBODIMENTS

The method disclosed herein includes the introduction of a proppant-free stage and a proppant laden stage into the wellbore and/or subterranean formation. Either the proppant-free stage or the proppant laden stage contains a breaker. The other stage contains a viscosifying polymer or viscoelastic surfactant to which the breaker has affinity. Such affinity renders the ability of the breaker to degrade or break down the viscosifying polymer or viscoelastic surfactant.

While the stage which contains the breaker may further contain a viscosifying polymer and/or viscoelastic surfactant, the breaker nonetheless has the greatest affinity for the viscosifying polymer and/or viscoelastic surfactant which is present in the stage not containing the breaker.

Introduction of the breaker into the wellbore and/or formation in a stage which is distinct from the stage containing the viscosifying polymer and/or viscoelastic surfactant (to which the breaker has the greatest affinity) increases the effective fracture width and enhances fracture conductivity within the formation.

Either the proppant-free stage or the proppant laden stage may further contain a friction reducer. When present in the same stage as the breaker, the breaker exhibits little, if any, affinity towards the friction reducer. As such, the breaker does not effectuate degradation of the friction reducer.

The proppant-free stage may be introduced prior to introduction of the proppant laden stage into the wellbore and/or formation. (It is understood that the proppant-free stage may be void of proppant or may contain a propping material but at a concentration which is insufficient for the material to function as a proppant. Alternatively, the proppant-free stage may be a pad fluid containing a high density fine particulate, such as fine mesh sand, for fluid loss control, or larger grain particulates, such as a slug of sand, to abrade perforations or near-wellbore tortuosity.) Alternatively, the proppant laden stage may be introduced into the wellbore and/or formation prior to introduction of the proppant-free stage.

In a preferred embodiment, the stage which does not contain the viscosifying polymer and/or viscoelastic surfactant is composed of water, salt brine or slickwater. In such instances, it is often desirable to introduce first the fluid containing the water, salt brine or slickwater prior to introduction into the formation and/or wellbore of the fluid which contains the viscosifying polymer and/or viscoelastic surfactant.

The invention may be practiced in a variety of manners provided that the breaker is present in a stage which is distinct from the stage which contains the viscosifying polymer and/or viscoelastic surfactant to which the breaker exhibits the greatest affinity. While a polymer, such as a friction reduction agent, may be present in the same stage as the breaker, it should be understood that the polymer to which the breaking agent has the highest affinity is present in a stage which is distinct from the stage which contains the breaker.

For example, in an embodiment of the invention, the hydraulic fracturing method may be defined by a proppant-free fluid which contains a viscosifying polymer and/or viscoelastic surfactant. A lower loading of viscosifying polymer and/or viscoelastic surfactant in the proppant-free gelled and/or crosslinked fluid than otherwise would be possible. The proppant-free fluid may be gelled and/or crosslinked. This proppant-free fluid may initiate fracturing within the formation. The gelled and/or crosslinked fluid often results in a filter cake deposit at the fracture face of the formation. The other stage which is introduced into the formation and/or wellbore is a proppant laden fluid. This proppant laden fluid may further contain the breaker which is capable of degrading the viscosifying polymer and/or viscoelastic surfactant which is present in the proppant-free fluid and/or the polymer-containing filter cake as well as other solids in the proppant laden fluid. The breaker in the proppant laden fluid has greater affinity for the polymer or surfactant in the proppant-free fluid than any polymer or surfactant which may be present in the proppant laden fluid. For instance, if the proppant laden fluid contains a friction reduction agent, the breaker has much higher affinity for the viscosifying polymer and/or viscoelastic surfactant in the proppant-free fluid than the friction reduction agent in the proppant laden fluid.

In another example, the proppant laden stage contains a viscosifying polymer, viscoelastic surfactant or thickened surfactant. The proppant laden slurry may be gelled and/or crosslinked. A second stage is free of proppant. In this embodiment, the second stage may further contain a viscoelastic surfactant or a friction reduction polymer. The second or proppant-free stage further contains a breaker. Should the breaker exhibit any affinity for the viscoelastic surfactant and/or friction reduction polymer which may be present in the proppant-free stage, the breaker nevertheless exhibits greater affinity for the viscosifying polymer, viscoelastic surfactant or thickened surfactant which is present in the proppant laden stage.

In yet another example of the invention, the proppant laden stage contains the breaker. In this example, the proppant-free stage contains a viscosifying polymer, viscoelastic surfactant or a thickened surfactant and may be gelled and/or crosslinked. The proppant laden stage may further contain one or more viscoelastic surfactants and friction reduction polymers. The breaker in this embodiment has higher affinity for the viscosifying polymer, viscoelastic surfactant and/or thickened surfactant present in the proppant-free stage than any viscosifying polymer, viscoelastic surfactant or thickened surfactant which may be present in the proppant laden stage. When pumped into the formation and/or wellbore, the proppant-free stage initiates fractures within the formation. Subsequent to the introduction of the proppant-free fluid into the formation and/or wellbore, the proppant laden slurry may then be introduced. The breaker, having affinity for the viscosifying polymer and/or viscoelastic surfactant in the proppant-free fluid degrades the viscosifying polymer and/or viscoelastic surfactant present in the proppant-free fluid.

In another illustrative example employing the invention, the proppant laden slurry pumped into the formation contains a gelled viscoelastic surfactant and the proppant-free stage contains (i) a friction reduction polymer and (ii) a breaker for the viscoelastic surfactant of the proppant laden slurry.

In a further example encompassing the invention, the proppant-free stage which is introduced into the formation contains a viscoelastic surfactant gelled fluid and the proppant laden slurry contains (i) a friction reduction polymer and (ii) a breaker for the viscoelastic surfactant.

In still another example using the methodology of the invention, a proppant-free gelled and/or crosslinked fluid containing at least one viscosifying polymer and/or viscoelastic surfactant is pumped into the formation and/or wellbore and a fracture is initiated. A proppant laden slurry which further contains at least one breaker is pumped into the formation and/or wellbore. A filter cake is deposited onto the fracture face of the formation, the filter cake being composed at least in part by the at least one polymer and/or viscoelastic surfactant. The breaker is then instrumental in degradation of the filter cake.

Still, a proppant-free gelled and/or crosslinked fluid containing a viscosifying polymer and/or a viscoelastic surfactant may be pumped into the formation and/or wellbore and a fracture initiated, wherein the proppant-free gelled and/or crosslinked fluid does not contain a breaker. The proppant laden slurry is then pumped into the formation and/or wellbore which contains at least one breaker. The breaker in the proppant laden slurry has greater affinity for the polymer in the proppant-free gelled and/or crosslinked fluid than any polymer or viscoelastic fluid which may be present in the proppant laden slurry.

In a second stage, a proppant laden fluid or slurry is introduced. This stage contains a proppant and a breaker. The breaker in the proppant laden fluid exhibits affinity for the viscosifying polymer or surfactant in the proppant-free gelled and/or crosslinked fluid. In another words, the breaker in the proppant laden fluid breaks or fragments the polymer or surfactant in the proppant-free gelled and/or crosslinked fluid. Where the proppant laden fluid contains a polymer or surfactant, such as a friction reduction agent, the breaker in the proppant laden fluid nevertheless exhibits greater affinity or reactivity towards the viscosifying polymer and/or surfactant in the proppant-free gelled and/or crosslinked fluid than the polymer and/or surfactant in the proppant laden slurry.

The invention has particular applicability when one of the stages does not contain any viscosifying polymer and/or viscoelastic surfactant. This stage, which may be the proppant laden or proppant-free stage, may contain water, salt brine or slickwater. In such instances, the breaker may be present in the stage which does not contain the viscosifying polymer and/or viscoelastic surfactant. Alternatively, the breaker may be present in the other stage.

In a preferred embodiment, the proppant-free fluid is a substantially non-viscosified fluid and is pumped into the formation prior to pumping of the proppant laden slurry. In another embodiment, the proppant-free fluid is a viscosified, gelled or crosslinked fluid and is pumped into the formation prior to the pumping of the proppant laden slurry which is substantially non-viscosified.

Examples of suitable aqueous fluids for use in either stage of the invention include, but are not limited to, water, brine, aqueous-based foams, water-alcohol mixtures, etc. Either stage may contain any aqueous fluid which is suitable for hydrating a hydratable polymer.

The fluid may further be a gelled or crosslinked oil based fluids, such as those described in U.S. Pat. No. 3,710,865 and U.S. Pat. No. 4,442,897, herein incorporated herein by reference.

The viscosifying polymer referenced herein may be a thickening polymer such as a hydratable polymer like, for example, one or more polysaccharides capable of forming linear or crosslinked gels. These include glactomannan gums, guars, derivatized guars, cellulose and cellulose derivatives, starch, starch derivatives, xanthan, derivatized xanthan and mixtures thereof.

Specific examples include, but are not limited to, guar gum, guar gum derivative, locust bean gum, welan gum, karaya gum, xanthan gum, scleroglucan, diutan, cellulose and cellulose derivatives, etc. More typical polymers or gelling agents include guar gum, hydroxypropyl guar (HPG), carboxymethyl hydroxypropyl guar (CMHPG), hydroxyethyl cellulose (HEC), carboxymethyl hydroxyethyl cellulose (CMHEC), carboxymethyl cellulose (CMC), dialkyl carboxymethyl cellulose, etc. Other examples of polymers include, but are not limited to, phosphomannans, scerolglucans and dextrans. In a preferred embodiment, carboxymethyl hydroxypropyl guar is employed.

The fluid containing the viscosifying polymer may further include a crosslinking agent. In this regard, any crosslinking agent suitable for crosslinking the hydratable polymer may be employed. Examples of suitable crosslinking agents include metal ions such as aluminum, antimony, zirconium and titanium-containing compounds, including organotitanates. Examples of suitable crosslinkers may also be found in U.S. Pat. No. 5,201,370; U.S. Pat. No. 5,514,309, U.S. Pat. No. 5,247,995, U.S. Pat. No. 5,562,160, and U.S. Pat. No. 6,110,875, incorporated herein by reference.

In a preferred embodiment, the viscosifying polymer is a guar or derivatized guar. Suitable crosslinkers for guar based polymers include borate ion donating materials. Examples of borate-based crosslinkers include, but are not limited to, organo-borates, mono-borates, poly-borates, mineral borates, etc.

A particularly preferred derivatized guar is CMHPG employed with a zirconium-based crosslinker. Such a polymer fracturing fluid is available as MEDALLION FRAC 4000 HT from BJ Services Company. Other examples of suitable polymer fracturing fluids that may be employed include non crosslinked guar gelled water (such as AQUA FRAC), methanol crosslinked HPG (such as METHOFRAC), borate crosslinked guar (such as VIKING, VIKING D and SPECTRAFRAC G), crosslinked hydrochloric acid-based acrylic polymer (such as XL ACID II), all of the designated products being made available from BJ Services Company.

The viscoelastic surfactant referenced herein is those which are capable of providing the requisite width to the initiated fracture. The viscoelastic surfactant may be micellular, such as worm-like micelles, surfactant aggregations or vesicles, lamellar micelles, etc. Such micelles include those set forth in U.S. Pat. Nos. 6,491,099; 6,435,277; 6,410,489; and 7,115,546.

Suitable viscoelastic surfactants include cationic, amphoteric and anionic surfactants. Suitable cationic surfactants include those having only a single cationic group which may be of any charge state (e.g., the cationic group may have a single positive charge or two positive charges). The cationic group preferably is a quaternary ammonium moiety (such as a linear quaternary amine, a benzyl quaternary amine or a quaternary ammonium halide), a quaternary sulfonium moiety or a quaternary phosphonium moiety or mixtures thereof. Preferably the quaternary group is quaternary ammonium halide or quaternary amine, most preferably, the cationic group is quaternary ammonium chloride or a quaternary ammonium bromide.

The amphoteric surfactant preferably contains a single cationic group. The cationic group of the amphoteric surfactant is preferably the same as those listed in the paragraph above. The amphoteric surfactant may be one or more of glycinates, amphoacetates, propionates, betaines and mixtures thereof. Preferably, the amphoteric surfactant is a glycinate or a betaine and, most preferably, the amphoteric surfactant is a linear glycinate or a linear betaine.

The cationic or amphoteric surfactant has a hydrophobic tail (which may be saturated or unsaturated). Preferably the tail has a carbon chain length from about $C_{12}$-$C_{18}$. Preferably, the hydrophobic tail is obtained from a natural oil from plants, such as one or more of coconut oil, rapeseed oil and palm oil. Exemplary of preferred surfactants include N,N,N trimethyl-1-octadecammonium chloride: N,N,N trimethyl-1-hexadecammonium chloride; and N,N,N trimethyl-1-soyaammonium chloride, and mixtures thereof.

Exemplary of anionic surfactants are sulfonates, phosphonates, ethoxysulfates and mixtures thereof. Preferably the anionic surfactant is a sulfonate. Most preferably the anionic surfactant is a sulfonate such as sodium xylene sulfonate and sodium naphthalene sulfonate.

In one preferred embodiment, a mixture of surfactants are utilized to produce a mixture of (1) a first surfactant that is one or more cationic and/or amphoteric surfactants set forth above and (2) at least one anionic surfactant set forth above.

The relative amounts of the viscosifying polymer and/or surfactants in the stages referenced herein may be determined based upon the desired viscosity of the fluid. In particular, in operation, the viscosity of the fluid may first be determined. Further, the volume of the fluid which is required may be determined at this time. The requisite amount of surfactant to obtain the predetermined viscosity may then be combined with the requisite amount of water to produce the fluid.

Preferably where a mixture of surfactants are used, such as those disclosed in U.S. Pat. No. 6,875,728 or U.S. Pat. No. 6,410,489 (herein incorporated by reference), the amount of the cationic/amphoteric surfactant and the amount of anionic surfactant which are used is preferably sufficient to neutralize, or at least essentially neutralize, the charge density of the surfactants. Accordingly, if the cationic surfactant is N,N,N, trimethyl-1-octadecammonium chloride and the anionic surfactant is sodium xylene sulfonate, then the surfactants may be combined in a ratio from about 1:4 to about 4:1 by volume to obtain a clear viscoelastic gel which is capable of transporting a proppant. Typically of such viscoelastic surfactants are AquaStar, a product of BJ Services Company.

The presence of the surfactant in either stage may further be desirable for use in environments having higher leak off potential. Typically, where a surfactant is used in the one stage, it is not used in the other. For instance, where a surfactant is used in the proppant laden slurry, the surfactant is not used in the proppant-free fluid or stage.

Any breaker known in the hydraulic fracturing art may be employed. A breaker is chosen based on its affinity towards the viscosifying polymer and/or viscoelastic surfactant in the stage not containing the breaker. Ideally, a breaker is selected which exhibits high activity towards the stage which contains the viscosifying polymer and/or viscoelastic surfactant and which does not contain the breaker. The breaker is thus selected such that it is capable of degrading, enhancing the degradation of or reducing the viscosity of one or more polymers or gelled surfactants in the stage which does not contain the breaker. In addition, the breaker is ideally capable of degrading and/or disintegrating the filter cake.

The breaker may be a delayed acting enzyme. Encapsulated breakers are often preferred since they do not interact with other well treatment agents which may be present in the stages.

In some instances, the breaker, especially when present in the proppant laden fluid, may enhance degradation of the filter cake during flow-back of the proppant laden fluid. As such, the breaker increases fracture conductivity within the formation.

The method provides an avenue for more efficient degradation of the filter cake via the use of a higher concentration of breaker than normally permitted for use in conventional methods. In a conventional method, the concentration of breaker which may be added into the formation is limited due to early viscosity reductions as the breaker-containing fluid becomes exposed to high temperatures. By adding the breaker in a different stage, the potential for early viscosity reduction is mitigated.

As formation fluids are recovered from the formation, they tend to flow from the reservoir or formation face into the wellbore. The removal of such fluid may be accomplished in conjunction with recovery of treatment fluids, such as by natural flow back, artificial lift, swabbing, energized flow back, jetting, etc. Further the benefits of the method disclosed herein may be realized without such recovery or flow back of treatment fluids.

Any amount or concentration of breaker suitable for degrading or reducing the viscosity of the viscosifying polymer and/or viscoelastic surfactant in the other stage or filter cake or other solids may further be used. Often, the concentration of breaker used in the proppant laden or proppant-free stage is that sufficient to cause complete degradation of the filter cake which is formed at the fracture face of the formation. Typically, such breakers are included in their respective fluid in a concentration of between about 0.1 lb/1000 gals. and about 10 lb/100 gals.

Suitable breakers may include oils, such as mineral oil. Oil breakers have particular applicability in the breaking of surfactant-gelled fluids.

At other times, the breaker may be an enzyme or oxidative breaker and may include encapsulated breakers, delayed acting breakers, enzyme precursors as well as enzymatically catalyzed oxidizers.

Examples of suitable types of oxidizing breakers include, but are not limited to, ammonium persulfate, sodium persulfate, ammonium peroxydisulfate, encapsulated ammonium persulfate, potassium persulfate, encapsulated potassium persulfate, inorganic peroxides, sodium bromate, sodium perchlorate, encapsulated inorganic peroxides, organic peroxides, encapsulated organic peroxides, sodium perborate, magnesium perborate, calcium perborate, encapsulated sodium perborate. Specific examples of suitable oxidizing materials include, but are not limited to, breakers available from BJ Services as GBW5 (ammonium persulfate), GBW7 (sodium perborate), GBW23 (magnesium peroxide), GBW24 (calcium peroxide), GBW36 (encapsulated potassium persulfate), HIGH PERM CRB (encapsulated potassium persulfate), HIGH PERM CRB LT (encapsulated persulfate), ULTRA PERM CRB (encapsulated potassium persulfate), SUPER ULTRA PERM CRB (encapsulated potassium persulfate), and TRIGINOX (organic peroxide).

Further, any enzyme suitable for degrading or otherwise reducing the viscosity of a filter cake and/or gel residue may be employed. Such enzymes include those described in U.S. Pat. No. 5,165,477; U.S. Pat. No. 5,201,370; U.S. Pat. No. 5,247,995; and/or U.S. Pat. No. 5,562,160; and/or U.S. Pat. No. 6,110,875.

The enzymes may be tailored to the specific viscosifying polymer in the stage not containing the breaker such that the enzymes exhibit the greatest affinity for the targeted polymer or surfactant. Although any suitable type of enzyme may be employed, preferred enzymes include hydrolases, lyases, transferases and oxidoreductases. More typically, hydrolases or lyases, and most typically hydrolases, are employed.

Although any hydrolase suitable for degrading and/or otherwise reducing the viscosity of a particular polysaccharide or mixture of polysaccharides may be used, most typically the following categories of hydrolases are employed. For guar containing polymeric fluids, an enzyme treatment fluid typically includes hydrolase enzymes specific to attack mannosidic and galactomannosidic linkages in the guar residue, breaking the molecules into monosaccharide and disaccharide fragments. Under some conditions, these enzymes may hydrolyze the residue completely into monosaccharide fragments. In a preferred embodiment, the breaker is a mannanase which specifically hydrolyzes the (1,4)-β-D-mannosidic linkages between the monosaccharide units in the viscosifying polymer. Further hydrolases include galactomannan hydrolases collectively referred to as galactomannanases and which specifically hydrolyze (1,6)-α-D-galactomannosidic and the (1,4)-β-D-mannosidic linkages between the monosaccharide units in the guar backbone, respectively. Examples of galactomannanases include ENZYME G, from BJ Services Company. See U.S. Pat. No. 5,562,160; U.S. Pat. No. 5,201,370; U.S. Pat. No. 5,514,309; U.S. Pat. No. 5,247,995; and U.S. Pat. No. 6,110,875, all of which are incorporated by reference.

Any suitable concentration of breaker may be employed. In a preferred embodiment, a hydrolase is used in the range of from about 0.001 to about 0.004% by weight, based on the total weight of aqueous fluid.

In another embodiment, an enzyme for use for degrading a cellulose-containing or derivatized cellulose-containing fluid may include specific enzymes to attack glucosidic linkages of the cellulose backbone. Typically these enzymes are any enzymes or combination of enzymes suitable for attacking the glucosidic linkages of a cellulose polymer backbone and of degrading the polymer into mostly monosaccharide units including, but not limited to, cellulase, nonspecific hemicellulases, glucosidase, endo-xylanase, exo-xylanase, etc. Two typical enzymes are commonly called exo- and endo-xylanases. The most typical enzymes for use with cellulose based polymer treatment fluids specifically hydrolyze the exo(1,4)-β-D-glucosidic and endo(1,4)-β-D-glucosidic linkages between monosaccharide units and the cellulose backbone in the (1,4)-β-D-glucosidic linkages of any cellobiose fragments. Examples of the most typical xylanases include ENZYME C, ENZYME CHT, GBW-13 and GBW-26 from BJ Services Company. The most typical enzyme is a 1:4 (w/w) aqueous solution of exo(1,4)-β-D-xylanase and endo (1,4)-β-D-xylanase. Normally, the xylanases are present in a range of from about 0.01% to about 10% by volume based on the total volume of aqueous fluid, most typically about 0.5%.

For use in the degradation of starch, the enzyme may be selected from one or more of endo-amylases, exo-amylases, isoamylases, glucosidases, α-glucosidases, glucan (1,4)-α-glucosidase, glucan (1,6)-α-glucosidase, oligo-(1,6)-glucosidase, α-glucosidase, α-dextrin endo-(1,6)-α-glucosidase, amylo-(1,6)-glucosidase, glucan-(1,4)-.alpha.-maltotetrahydralase, glucan-(1,6)-α-isomaltosidase, glucan-(1,4)-α-maltohexaosidase, etc. The most typical endo-amylase is selected based on conditions present in the formation, such as pH and temperature. The amount of enzyme used in this embodiment is the same as discussed above for the cellulose filter cake.

For use in the degradation of xanthan, hydrolases which break down the 1,4-β-D-glucosidic linkages within a cellulose backbone are typically employed. Examples include one or more of the same enzymes described above for cellulose containing proppant-free fluids and mannosidase or mannan (1,2)-β-D-mannosidase.

Either the proppant laden or proppant-free fluid may also contain one or more friction reduction well treatment agents. Typically, such friction reduction well treatment agents are polyacrylamides, viscoelastic surfactants, etc. When present, such friction reduction well treatment agents are at such low concentrations that any increase in viscosity attributable to them is minimal and inconsequential. Typically, such friction reduction agents do not increase the viscosity of the proppant laden slurry or the proppant-free gelled and/or crosslinked fluid by any more than 1 to 2 cP.

The success of the methodology disclosed herein is dependent on the ability of the breaker to have its greater affinity for the viscosifying polymer and/or viscoelastic surfactant in the stage or fluid which does not contain the breaker. In other words, the breaker should preferably have little, if any, any affinity for any polymer (including a friction reduction well treatment agent) which is present in the stage as the breaker.

The introduction of proppant-free fluid into the wellbore and/or formation provides a sufficient frac width which polymer-free fluids are not capable of providing. The method of the invention therefore provides an acceptable methodology for the stimulation of tight gas reservoirs by providing improved transport of proppant in polymer-free fluids and placement of proppant at acceptable fracture width within the formation. Further, the methodology further provides introduction of a proppant laden slurry into the formation wherein the concentration of proppant in the slurry is sufficient so as to achieve a partial monolayer fracture such that a partial monolayer fracture is created in the formation.

A partial monolayer of proppant provides increased interstitial spaces between proppant particulates which are desired in order to increase conductivity. The partial monolayer fracture is created by use of a reduced volume of proppant particulates in the fracture and the widely spaced proppant particulates. The produced fluids typically flow around the widely-spaced proppant particulates rather than through the interstitial spaces in a packed bed, thus providing increased fracture conductivity. The phenomena of partial monolayer fracturing has been discussed in the literature. See, for instance, Brannon et al, "Maximizing Fracture Conductivity with Partial Monolayers: Theoretical Curiosity or Highly Productive Reality" SPE 90698, presented at the SPE Annual Technical Conference and Exhibition, Houston, Sep. 26-29, 2004.

In another embodiment, the pH of the stage which contains the breaker may be modified so as to temporarily inactivate the breaker (for instance, where the breaker is an enzyme, the enzyme may be inactivated at a pH of about 10). After placement in the formation, the pH of the stage containing the breaker will tend to return to the active pH range of the breaker (enzyme).

Propping agents which may be employed in the proppant laden slurry include any propping agent suitable for hydraulic fracturing known in the art. Examples include, but are not limited to, silica, quartz sand grains, glass and ceramic beads, walnut shell fragments, aluminum pellets, nylon pellets, resin-coated sand, synthetic organic particles, glass microspheres, sintered bauxite, mixtures thereof and the like.

In a preferred embodiment, the proppant is a relatively lightweight or substantially neutrally buoyant particulate material or a mixture thereof. Such proppants may be chipped, ground, crushed, or otherwise processed. By "relatively lightweight" it is meant that the proppant has an apparent specific gravity (ASG) that is substantially less than a conventional proppant employed in hydraulic fracturing operations, e.g., sand or having an ASG similar to these materials. Especially preferred are those proppants having an ASG less than or equal to 3.25. Even more preferred are ultra lightweight proppants having an ASG less than or equal to 2.25, more preferably less than or equal to 2.0, even more preferably less than or equal to 1.75, most preferably less than or equal to 1.25 and often less than or equal to 1.05.

Such proppants include ceramics, resin coated ceramics, glass microspheres, sintered bauxite, resin-coated sintered bauxite, aluminum pellets, aluminum needles, or nylon pellets or a mixture thereof. The proppant may further be a resin coated ceramic proppant or a synthetic organic particle such as nylon pellets, ceramics (including aluminosilicates such as "CARBOLITE," "NAPLITE" or "ECONOPROP"). Suitable proppants further include those set forth in U.S. Patent Publication No. 2007/0209795 and U.S. Patent Publication No. 2007/0209794, herein incorporated by reference. The proppant may further be a plastic or a plastic composite such as a thermoplastic or thermoplastic composite or a resin or an aggregate containing a binder.

By "substantially neutrally buoyant", it is meant that the proppant has an ASG close to the ASG of an ungelled or weakly gelled carrier fluid (e.g., ungelled or weakly gelled completion brine, other aqueous-based fluid, or other suitable fluid) to allow pumping and satisfactory placement of the proppant using the selected carrier fluid. For example, urethane resin-coated ground walnut hulls having an ASG of from about 1.25 to about 1.35 may be employed as a substantially neutrally buoyant proppant particulate in completion brine having an ASG of about 1.2. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than about 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 pounds per thousand gallons of polymer per thousand gallons of base fluid. (If the ungelled carrier fluid is slickwater with a friction reducer, which is typically a polyacrylamide, there is technically 1 to as much as 8 pounds per thousand of polymer, but such minute concentrations of polyacrylamide do not impart sufficient viscosity (typically <3 cP) to be of benefit)

Other suitable relatively lightweight proppants are those particulates disclosed in U.S. Pat. Nos. 6,364,018, 6,330,916 and 6,059,034, all of which are herein incorporated by reference. These may be exemplified by ground or crushed shells of nuts (pecan, almond, ivory nut, brazil nut, macadamia nut, etc); ground or crushed seed shells (including fruit pits) of seeds of fruits such as plum, peach, cherry, apricot, etc.; ground or crushed seed shells of other plants such as maize (e.g. corn cobs or corn kernels), etc.; processed wood materials such as those derived from woods such as oak, hickory, walnut, poplar, mahogany, etc. including such woods that have been processed by grinding, chipping, or other form of particalization. Preferred are ground or crushed walnut shell materials coated with a resin to substantially protect and water proof the shell. Such materials may have an ASG of from about 1.25 to about 1.35.

Further, the relatively lightweight particulate for use in the invention may be a selectively configured porous particulate, as set forth, illustrated and defined in U.S. Pat. No. 7,426,961, herein incorporated by reference.

The amount present in the proppant laden fluid or slurry is that amount necessary to effectuate the desired result. Typically, the amount of proppant is based on the properties of the proppant such as its apparent specific gravity, median diameter, etc.

Either the proppant-free fluid or the proppant laden slurry may contain other conventional additives common to the well service industry, such as surfactants, and the like.

Although the proppant laden slurry may be immediately introduced into the wellbore and/or formation after the polymer-containing fracturing fluid, occasionally a spacer between the stages may be employed. Such a spacer may be employed, for example, to clean up mixing and pumping equipment. A spacer may include any fluid common to the oil treating industry, including aqueous-based fluids such as gelled water, fresh water, light brines, saturated brines, etc. Examples of other suitable spacers include, but are not limited to, oil or hydrocarbon-based fluids, gases, foams, mists, etc., although an aqueous fluid is typically employed. Examples of typical types of aqueous spacers include, but are not limited to, fresh water, sodium chloride brines, potassium chloride brines, and mixtures thereof. Furthermore, such a spacer may contain additives known in the art, including polymers. In this regard, the function of a spacer may be to help isolate the polymer-containing treatment fluid from the enzymes in the proppant laden slurry, thereby preventing premature breaking or degradation of the polymers in the fracturing fluid.

Although any volume of spacer suitable for separating the fracturing fluid from the proppant laden slurry may be used, the spacer volume is typically selected based on the volume of fluid required to clean-up surface equipment (e.g., blender, lines, pumps, etc.) and wellbore tubulars.

In well stimulation treatment embodiments, the proppant laden slurry may be immediately followed by a flush stage to displace the slurry into the formation. In this regard, a flush may be any suitable displacement fluid, such as one or more of those fluid types mentioned as suitable for use as spacer fluids.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

A standard 10 in$^2$ API fracture conductivity cell was prepared with 2 lb/ft$^2$ pack of 12/18 ceramic proppant, commercially available as CARBO LITE® from Carbo Ceramics Inc., placed between Ohio Sandstone cores. The cell was loaded onto a Dake press and subjected to a closure stress of 2,000 psi and a temperature of 195° F. Once at the required pressure and temperature, pre-conditioned de-ionized water was flowed through the proppant pack at 10 ml/min and with 300 psi back pressure.

In order to build a resilient filter cake on the faces of the sandstone core, a 25 lb./1,000 gallons zirconate crosslinked carboxymethyl guar fracturing fluid slickwater system was selected for injection into the proppant pack. More specifically, 80 ml [≈5 pore volumes (PVs)] of the crosslinked fluid were pumped through the proppant pack and at the same time allowed to leakoff through the sandstone cores to atmospheric pressure (300 psi differential), allowing the fluid to build a concentrated polymer filter cake on the faces of the core. After injection, the proppant pack and fluid were shut-in (no flow) for 24 hours before low rate water cleanup was initiated. Over several hours, water was flowed at stepped rates from 0.5 ml/min to 10 ml/min before the regain permeability and conductivity were measured and determined to be less than 1% of the original baseline.

A second conductivity test was simultaneously completed under exactly the same test conditions as above, stacked on the same press, with the same proppant and the same damaging crosslinked fluid injected with leakoff. This test showed an almost identical response to initial cleanup, with the regain being only 1% of the baseline after 72 hours of flow.

The first test was then treated with a 5 gallons per thousand (gpt) solution of Enzyme G breaker, a product of BJ Services Company (33 parts slickwater: 1 part breaker solution). In a similar manner as before, 80 ml (≈5 PVs) of the enzyme solution were pumped through the proppant pack and allowed to leakoff through the sandstone cores.

The second cell was treated in an identical manner except that no breaker was added to the injected fluid. The proppant packs were then shut-in (no flow) for 24 hours. Water cleanup was again initiated at low rates and ramped from 0.5 ml/min to 10 ml/min. Differential pressure measurements within the pack indicated a significant improvement in the regain permeability and conductivity of the proppant pack containing breaker in the injection fluid. At the completion of the low rate flow stage, Test 1 was observed to exhibit 2,598 md ft conductivity compared to 1272 millidarcies feet (mD-ft) for Test 2. In the high rate flow cleanup regime, Test 1 exhibited 2941 mD-ft compared to 1,444 mD-ft for Test 2. The data is set forth in Table I below.

TABLE I

| Test ID | Conductivity After Low Rate 0.5 to 10 ml/min | Conductivity After High Rate 10-40 ml/min |
| --- | --- | --- |
| Cell 1—After Water Injection including enzyme breaker | 2598 mD-ft | 2941 mD-ft |
| Cell 2—After Water Injection (Blank) | 1272 mD-ft | 1444 mD-ft |

From the foregoing, it will be observed that numerous variations and modifications may be effected without departing from the true spirit and scope of the novel concepts of the invention.

What is claimed is:

1. A method of hydraulically fracturing a subterranean formation comprising:
   (a) pumping into the formation at least two stages wherein a first stage is a proppant-free fluid and a second stage is a proppant laden slurry and further wherein one of the stages contains at least one member selected from the group consisting of viscosifying polymers and viscoelastic surfactants; and the other stage contains a breaker and optionally a viscosifying polymer, viscoelastic surfactant and/or friction reduction agent; and
   (b) degrading the viscosifying polymer or viscoelastic surfactant of the stage containing said at least one member with the breaker of the other stage
wherein the breaker has greater affinity for the viscosifying polymer or viscoelastic surfactant of said at least one member than the optional viscosifying polymer, viscoelastic surfactant and/or friction reduction agent which may be present in the stage containing the breaker.

2. The method of claim 1, wherein the first stage is introduced into the formation prior to the second stage.

3. The method of claim 2, wherein the second stage contains a friction reduction polymer.

4. The method of claim 1, wherein the second stage is introduced into the formation prior to the first stage.

5. The method of claim 1, wherein the at least one member is present in the proppant-free fluid.

6. The method of claim 1, wherein the at least one member is present in the proppant laden slurry.

7. The method of claim 1, wherein the first stage contains a friction reduction polymer.

8. The method of claim 1, wherein the breaker is at least one enzyme or oxidative breaker.

9. The method of claim 8, wherein the breaker is an encapsulated breaker, delayed acting breaker, an enzyme precursor or an enzymatically catalyzed oxidizer.

10. The method of claim 8, wherein the breaker is oil or oil-based.

11. The method of claim 8, wherein the breaker is selected from the group consisting of ammonium persulfate, ammonium peroxydisulfate, sodium persulfate, sodium bromate, encapsulated ammonium persulfate, potassium persulfate, encapsulated potassium persulfate, sodium persulfate, sodium bromate, inorganic peroxides, encapsulated inorganic peroxides, organic peroxides, encapsulated organic peroxides, sodium perborate, magnesium perborate, calcium perborate and encapsulated sodium perborate.

12. The method of claim 8, wherein the breaker is at least one enzyme or oxidative breaker selected from the group consisting of hydrolases, lyases, transferases and oxidoreductases.

13. The method of claim 1, wherein the proppant laden slurry contains slickwater.

14. The method of claim 13, wherein the proppant laden slurry is introduced into the formation at a concentration sufficient to achieve a partial monolayer fracture and further wherein a partial monolayer fracture is created in the formation.

15. The method of claim 1, wherein the proppant laden slurry is introduced into the formation at a concentration sufficient to achieve a partial monolayer fracture and further wherein a partial monolayer fracture is created in the formation.

16. The method of claim 1, wherein the at least one member is a gelled and/or crosslinked fluid.

17. The method of claim 16, wherein the gelled and/or crosslinked fluid is guar or a guar derivative.

18. The method of claim 17, wherein the at least one breaker is selected from the group consisting of hydrolase enzymes specific to attack mannosidic and galactomannosidic linkages in the guar residue.

19. The method of claim 17, wherein the at least one member is selected from the group consisting of galactomannan gums, welan gum, guars, derivatized guars, cellulose and cellulose derivatives, starch, starch derivatives, xanthan, derivatized xanthan, scleroglucan, diutan and mixtures thereof.

20. The method of claim 19, wherein the at least one polymer is selected from the group consisting of guar gum, guar gum derivative, locust bean gum, karaya gum, xanthan gum, cellulose and cellulose derivatives.

21. The method of claim 20, wherein the at least one polymer is selected from the group consisting of guar gum, hydroxypropyl guar, carboxymethyl guar, carboxymethyl hydroxypropyl guar, hydroxyethyl cellulose, carboxymethyl hydroxyethyl cellulose, carboxymethyl cellulose, dialkyl carboxymethyl cellulose, phosphomannans, scleroglucans, xanthans, and dextrans.

22. The method of claim 16, wherein the breaker is a galactomannase which specifically hydrolyzes (1,6)-α-D-galactomannosidic and the (1,4)-β-D-mannosidic linkages between the monosaccharide units in the at least one polymer.

23. The method of claim 22, wherein the breaker is a mannanase which specifically hydrolyzes the (1,4)-β-D-mannosidic linkages between the monosaccharide units in the at least one polymer.

24. The method of claim 1, wherein the at least one member is a viscosifying polymer which is a cellulose or derivatized cellulose and the breaker is capable of attacking the glucosidic linkages of the cellulose backbone and degrading the polymer into monosaccharide units.

25. The method of claim 24, wherein the at least one breaker is selected from the group consisting of cellulases, nonspecific hemicellulases, glucosidases, endo-xylanases and exo-xylanases.

26. The method of claim 1, wherein the proppant of the proppant laden slurry is selected from the group consisting of silica, quartz sand grains, glass and ceramic beads, walnut shell fragments, aluminum, polyamide, resin-coated sand, synthetic organic particles, glass microspheres, sintered bauxite, resin coated ceramics, resin-coated sintered bauxite or a mixture thereof.

27. The method of claim 1, wherein the apparent specific gravity of the proppant of the proppant laden slurry is less than or equal to 2.25.

28. The method of claim 27, wherein the proppant is selected from the group consisting of ground or crushed shells of nuts, ground or crushed seed shells of seeds of fruits or plants and processed wood materials.

29. The method of claim 27, wherein the proppant is selected from the group consisting of plastics and composites thereof, thermoplastic and composites thereof, resins, or aggregates containing binders.

30. The method of claim 27, wherein the apparent specific gravity of the proppant is less than or equal to 2.0.

31. The method of claim 30, wherein the apparent specific gravity of the proppant is less than or equal to 1.75.

32. The method of claim 31, wherein the apparent specific gravity of the proppant is less than or equal to 1.25.

33. The method of claim 32, wherein the apparent specific gravity of the proppant is less than or equal to 1.05.

34. The method of claim 1, wherein the at least one member is gelled and/or crosslinked and is derived from a hydratable polymer and a crosslinking agent.

35. The method of claim 34, wherein the crosslinking agent contains a metal ion selected from the group consisting of aluminum, antimony, zirconium and titanium.

36. The method of claim 34, wherein the proppant-free fluid is gelled and/or crosslinked and contains at least one polymer which is a guar or derivatized guar which is crosslinked with a borate ion donating material or a crosslinking agent which contains zirconium.

37. The method of claim 1, wherein the at least one member is a viscoelastic surfactant.

38. The method of claim 37, wherein the viscoelastic surfactant is a cationic, amphoteric or anionic surfactant or a mixture thereof.

39. The method of claim 38, wherein the viscoelastic surfactant is a mixture of one or more cationic and/or amphoteric surfactants and at least one anionic surfactant.

40. The method of claim 37, wherein the viscoelastic surfactant contains a member selected from the group consisting of N,N,N trimethyl-1-octadecammonium chloride: N,N,N trimethyl-1-hexadecammonium chloride and N,N,N trimethyl-1-soyaammonium chloride.

41. The method of claim 40, wherein the viscoelastic surfactant is a mixture of N,N,N, trimethyl-1-octadecammonium chloride and sodium xylene sulfonate.

42. A method of hydraulically fracturing a subterranean formation comprising:
(a) pumping into the formation a proppant-free fluid containing at least one viscosifying polymer and/or viscoelastic surfactant;
(b) introducing into the formation a proppant laden slurry which contains at least one breaker and optionally a viscosifying polymer or viscoelastic surfactant, wherein the proppant in the proppant laden slurry creates a partial monolayer of proppant in a fracture within the formation; and
(c) degrading the at least one viscosifying polymer and/or viscoelastic surfactant in the proppant-free fluid with the at least one breaker
wherein the at least one breaker has greater affinity for the at least one viscosifying polymer and/or viscoelastic surfactant in the proppant-free fluid than any viscosifying polymer or viscoelastic surfactant which may be present in the proppant laden slurry.

43. The method of claim 42, wherein the proppant laden slurry further comprises a friction reduction agent and further wherein the breaker has minimal, if any, affinity for the friction reduction agent.

44. The method of claim 42, wherein the proppant-free fluid is a gelled and/or crosslinked fluid and is pumped into the formation prior to the pumping of the proppant laden slurry.

45. The method of claim 42, wherein the proppant laden slurry is pumped first into the formation prior to the pumping of the proppant-free fluid.

46. A method of hydraulically fracturing a subterranean formation comprising pumping into the formation at least two stages wherein either:
(a) the first stage is a proppant laden slurry and contains a gelled and/or crosslinked polymer and the second stage is free of proppant which contains (i) a breaker and, optionally (ii) at least one member selected from the group consisting of viscoelastic surfactants and/or friction reduction polymers; or
(b) the first stage is free of proppant and contains a gelled and/or crosslinked polymer and the second stage is a proppant laden slurry which contains (i) a breaker and (ii) at least one member selected from the group consisting of viscoelastic surfactants and friction reduction polymers
wherein the breaker has greater affinity for the gelled and/or crosslinked polymer of the first stage than any viscoelastic surfactant and/or friction reduction polymer which may be present in the second stage.

47. The method of claim 46, wherein the proppant-free fluid is a viscosified, gelled or crosslinked fluid and is pumped into the formation prior to the pumping of the proppant laden slurry which is substantially non-viscosified.

48. The method of claim 46, wherein the at least one member is a gelled and/or crosslinked polymer and further wherein the breaker is at least one enzyme or oxidative breaker.

49. A method of hydraulically fracturing a subterranean formation comprising pumping into the formation at least two stages wherein either:
(a) the first stage is a proppant laden slurry and contains a gelled viscosifying polymer and/or viscoelastic surfactant and the second stage is free of proppant and contains (i) a friction reduction polymer and (ii) a breaker for the viscoelastic surfactant, wherein the breaker has greater affinity for the gelled viscosifying polymer and/or viscoelastic surfactant of the first stage than the friction reduction polymer of the second stage; or
(b) the first stage is free of proppant and is a gelled fluid which contains a viscosifying polymer and/or viscoelastic surfactant and the second stage is a proppant laden slurry which contains (i) a friction reduction polymer and (ii) a breaker for the viscosifying polymer and/or viscoelastic surfactant, wherein the breaker has greater affinity for the viscosifying polymer and/or viscoelastic surfactant of the first stage than the friction reduction polymer of the proppant laden slurry.

50. The method of claim 49, wherein the breaker is an oil.

51. The method of claim 49, wherein the proppant-free fluid is pumped into the formation prior to pumping the proppant laden slurry into the formation.

52. The method of claim 49, wherein the proppant laden slurry is pumped into the formation prior to pumping the proppant-free fluid.

53. A method of hydraulically fracturing a subterranean formation comprising:
   (a) pumping into either the formation or into a wellbore penetrating the formation a proppant-free gelled and/or crosslinked fluid containing at least one viscosifying polymer and/or viscoelastic surfactant and initiating a fracture therein;
   (b) introducing into the wellbore or formation a proppant laden slurry which contains at least one breaker and optionally a viscosifying polymer, viscoelastic surfactant and/or friction reduction agent;
   (c) degrading the at least one viscosifying polymer and/or viscoelastic surfactant in the proppant-free fluid with the at least one breaker
   wherein the at least one breaker has greater affinity for the at least one viscosifying polymer and/or viscoelastic surfactant in the proppant-free fluid than any optional viscosifying polymer, viscoelastic surfactant and/or friction reduction agent which may be present in the proppant laden slurry.

54. The method of claim 53, wherein the proppant-free fluid is pumped into the formation and/or wellbore prior to pumping of the proppant laden slurry into the formation and/or wellbore.

55. The method of claim 53, wherein the fluid of the proppant laden fluid is slickwater.

56. The method of claim 53, wherein the proppant laden fluid introduced into the formation at a concentration sufficient to create a partial monolayer of proppant in the fracture.

57. The method of claim 53, wherein a spacer is introduced into the wellbore and/or formation prior to the introduction of the proppant laden slurry.

58. A method of hydraulically fracturing a subterranean formation comprising:
   (a) pumping into either the formation or into a wellbore penetrating the formation a proppant-free gelled and/or crosslinked fluid containing at least one viscosifying polymer and/or viscoelastic surfactant and initiating a fracture therein; and
   (b) introducing into the wellbore or formation a proppant laden slurry which further contains at least one breaker
   wherein a filter cake is deposited onto the fracture face of the formation, the filter cake being composed at least in part by the at least one polymer and/or viscoelastic surfactant and further wherein the at least one breaker degrades at least a portion of the filter cake.

59. The method of claim 58, wherein the proppant laden slurry contains slickwater.

60. A method of hydraulically fracturing a subterranean formation comprising:
   (a) pumping into either the formation or into a wellbore penetrating the formation a proppant-free gelled and/or crosslinked fluid containing at least one viscosifying polymer and/or at least one viscoelastic surfactant and initiating a fracture therein, wherein the proppant-free gelled and/or crosslinked fluid does not contain a breaker; and
   (b) introducing into the wellbore or formation a proppant laden slurry which contains at least one breaker
   wherein the breaker in the proppant laden slurry has greater affinity for the at least one polymer in the proppant-free gelled and/or crosslinked fluid than any polymer or viscoelastic fluid which may be present in the proppant laden slurry.

61. The method of claim 60, wherein the proppant-free fluid is pumped into the formation and/or wellbore prior to introduction of the proppant laden slurry.

* * * * *